US009629354B2

(12) United States Patent
Cohen

(10) Patent No.: US 9,629,354 B2
(45) Date of Patent: *Apr. 25, 2017

(54) APPARATUS FOR USING MICROWAVE ENERGY FOR INSECT AND PEST CONTROL AND METHODS THEREOF

(71) Applicant: Nathaniel L. Cohen, San Diego, CA (US)

(72) Inventor: Nathaniel L. Cohen, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/575,240

(22) Filed: Dec. 18, 2014

(65) Prior Publication Data

US 2015/0101239 A1    Apr. 16, 2015

Related U.S. Application Data

(63) Continuation of application No. 13/766,672, filed on Feb. 13, 2013, now Pat. No. 8,943,744.

(60) Provisional application No. 61/600,508, filed on Feb. 17, 2012.

(51) Int. Cl.
*A01M 1/20* (2006.01)
*A01M 1/22* (2006.01)
*A01M 99/00* (2006.01)
*A01M 29/28* (2011.01)
(Continued)

(52) U.S. Cl.
CPC .......... *A01M 29/28* (2013.01); *A01M 1/2094* (2013.01); *A01M 1/22* (2013.01); *A01M 1/226* (2013.01); *A01M 5/02* (2013.01); *A01M 19/00* (2013.01); *A01M 99/00* (2013.01)

(58) Field of Classification Search
CPC    A01M 1/00; A01M 1/20; A01M 1/22; A01M 1/226; A01M 19/00; A01M 1/2094
USPC ............... 43/132.1, 124; 219/690, 679, 696; 343/786, 872, 833, 834, 700 MS, 795; 607/101, 102, 100; 128/898; 606/33, 41
See application file for complete search history.

(56) References Cited

U.S. PATENT DOCUMENTS 2,223,813 A * 12/1940 Brown .............................. 47/1.3
3,541,568 A * 11/1970 Lowenhar ................. H01P 3/14
                                                    333/251
3,699,976 A * 10/1972 Abe et al. .................... 43/132.1
(Continued)

FOREIGN PATENT DOCUMENTS

DE          3804052 A1 *   8/1989    ............. A01M 1/22
DE          3915750 A1 *  11/1990    ............ A01M 17/00
(Continued)

OTHER PUBLICATIONS

Saint Louis, Catherine "A Dark and Itchy Night", The New York Times, Dec. 5, 2012.
(Continued)

*Primary Examiner* — Darren W Ark
(74) *Attorney, Agent, or Firm* — Sheppard, Mullin, Richter & Hampton LLP

(57) ABSTRACT

An apparatus for using microwave energy for treating an infected site infested with insects or other small pests is disclosed. The apparatus comprises a source of microwave energy connected to a power source and a power controller, a transmission element, and an antenna. The apparatus can also comprise an isolator to protect the source of microwave energy. Methods to use such an apparatus for treatment of an infected site are also disclosed.

6 Claims, 6 Drawing Sheets

(51) Int. Cl.
*A01M 19/00* (2006.01)
*A01M 5/02* (2006.01)

(56) References Cited

U.S. PATENT DOCUMENTS

| | | | | |
|---|---|---|---|---|
| 3,739,385 | A * | 6/1973 | Bechtel | G01S 1/02 343/705 |
| 3,938,161 | A * | 2/1976 | Sanford | 343/829 |
| 3,940,718 | A | 2/1976 | Vilkatis | |
| 4,186,400 | A * | 1/1980 | Cermignani et al. | 343/708 |
| 4,249,174 | A * | 2/1981 | Lucchi | H01Q 1/287 342/204 |
| 4,251,950 | A * | 2/1981 | Farque et al. | 47/1.3 |
| 4,295,141 | A * | 10/1981 | Bogner | 343/785 |
| 4,348,680 | A * | 9/1982 | Collier | H01Q 3/22 342/375 |
| 4,366,644 | A * | 1/1983 | Lawrence | 43/132.1 |
| 4,370,534 | A * | 1/1983 | Brandon | 43/132.1 |
| 4,384,290 | A * | 5/1983 | Pierrot | G01S 13/74 244/3.19 |
| 4,471,787 | A * | 9/1984 | Bentall | A61N 1/40 607/154 |
| 4,514,734 | A * | 4/1985 | Cermignani | H01Q 1/286 343/708 |
| 4,749,997 | A * | 6/1988 | Canonico | 343/872 |
| 4,932,420 | A * | 6/1990 | Goldstein | A61N 5/04 607/156 |
| 5,058,313 | A * | 10/1991 | Tallon | 43/132.1 |
| 5,141,059 | A | 8/1992 | Marsh | |
| 5,184,419 | A * | 2/1993 | Tallon | 43/132.1 |
| 5,186,171 | A * | 2/1993 | Kuhry | A61N 1/40 607/156 |
| 5,206,656 | A * | 4/1993 | Hannan | 343/705 |
| 5,287,818 | A * | 2/1994 | Rajamannan | 47/1.42 |
| 5,296,666 | A * | 3/1994 | Varadan et al. | 219/696 |
| 5,364,392 | A * | 11/1994 | Warner | A61B 18/1206 607/101 |
| 5,405,346 | A * | 4/1995 | Grundy | A61B 18/1206 607/101 |
| 5,440,319 | A * | 8/1995 | Raymond et al. | 343/833 |
| 5,442,876 | A * | 8/1995 | Pedersen | 43/132.1 |
| 5,468,938 | A * | 11/1995 | Roy | 43/112 |
| 5,473,836 | A * | 12/1995 | Liu | 43/124 |
| 5,532,708 | A * | 7/1996 | Krenz | H01Q 9/40 343/795 |
| 5,575,106 | A * | 11/1996 | Martin et al. | 43/132.1 |
| 5,704,355 | A * | 1/1998 | Bridges | A61B 5/05 607/101 |
| 5,709,832 | A * | 1/1998 | Hayes | H01Q 9/30 264/271.1 |
| 5,712,643 | A * | 1/1998 | Skladany | H01Q 1/38 343/795 |
| 5,788,692 | A * | 8/1998 | Campbell | A61B 18/18 607/101 |
| 5,800,494 | A * | 9/1998 | Campbell | A61B 18/18 607/101 |
| 5,823,197 | A * | 10/1998 | Edwards | A61B 18/1477 128/898 |
| 5,889,498 | A * | 3/1999 | Lange et al. | 343/833 |
| 5,913,549 | A | 6/1999 | Skladany | |
| 5,968,401 | A * | 10/1999 | Roy | 43/132.1 |
| 6,087,989 | A * | 7/2000 | Song | H01Q 9/285 343/700 MS |
| 6,091,994 | A * | 7/2000 | Loos | A61M 21/00 607/100 |
| 6,111,237 | A | 8/2000 | Paustian | |
| 6,133,889 | A * | 10/2000 | Yarsunas | H01Q 11/10 343/795 |
| 6,192,622 | B1 * | 2/2001 | Haj-Yousef | 43/132.1 |
| 6,275,738 | B1 * | 8/2001 | Kasevich | A61B 18/1815 607/101 |
| 6,321,120 | B1 * | 11/2001 | Surbeck | A61N 1/40 607/101 |
| 6,322,584 | B2 * | 11/2001 | Ingle | 607/102 |
| 6,330,479 | B1 * | 12/2001 | Stauffer | A61N 5/02 607/101 |
| 6,409,720 | B1 * | 6/2002 | Hissong | A61N 7/022 128/898 |
| 6,463,336 | B1 * | 10/2002 | Mawhinney | A61N 1/40 607/103 |
| 6,496,155 | B1 * | 12/2002 | Sievenpiper et al. | 343/770 |
| 6,501,436 | B1 * | 12/2002 | Saito et al. | 343/867 |
| 6,527,768 | B2 * | 3/2003 | Berube | A61B 18/1815 606/33 |
| 6,572,639 | B1 * | 6/2003 | Ingle | A61N 1/403 607/101 |
| 6,616,657 | B2 * | 9/2003 | Simpson | A61B 18/1492 607/102 |
| 6,647,661 | B2 * | 11/2003 | Grigorov | 43/132.1 |
| 6,801,131 | B2 * | 10/2004 | Donskoy et al. | 340/573.1 |
| 6,837,001 | B2 * | 1/2005 | Amburgey et al. | 43/132.1 |
| 6,847,848 | B2 * | 1/2005 | Sterzer | A61B 18/18 607/101 |
| 6,955,672 | B2 * | 10/2005 | Cense | A61B 18/203 606/10 |
| 6,965,349 | B2 * | 11/2005 | Livingston | H01Q 1/422 342/374 |
| 6,976,986 | B2 * | 12/2005 | Berube | A61B 5/042 607/101 |
| 7,033,352 | B1 * | 4/2006 | Gauthier | A61B 18/1492 607/101 |
| 7,034,769 | B2 * | 4/2006 | Surducan | H01Q 1/38 343/795 |
| 7,052,491 | B2 * | 5/2006 | Erb | A61B 18/14 606/17 |
| 7,057,516 | B2 * | 6/2006 | Donskoy et al. | 43/132.1 |
| 7,095,382 | B2 * | 8/2006 | Surducan | H01Q 1/38 343/795 |
| 7,115,126 | B2 * | 10/2006 | Berube | A61B 18/14 607/101 |
| 7,156,841 | B2 * | 1/2007 | Berube | A61B 5/042 607/101 |
| 7,192,427 | B2 * | 3/2007 | Chapelon | A61B 18/1492 606/33 |
| 7,226,446 | B1 * | 6/2007 | Mody | A61B 18/18 606/33 |
| 7,301,131 | B2 * | 11/2007 | Gauthier | A61B 18/1492 607/101 |
| 7,303,560 | B2 * | 12/2007 | Chin | A61B 18/1492 600/146 |
| 7,311,702 | B2 * | 12/2007 | Tallarida | A61B 18/1492 607/101 |
| 7,346,399 | B2 * | 3/2008 | Berube | A61B 18/1492 606/33 |
| 7,387,627 | B2 * | 6/2008 | Erb | A61B 18/14 606/33 |
| 7,393,352 | B2 * | 7/2008 | Berube | A61B 5/042 607/101 |
| 7,423,606 | B2 * | 9/2008 | Knadle et al. | 343/833 |
| 7,497,858 | B2 * | 3/2009 | Chapelon | A61B 18/1492 606/33 |
| 7,560,673 | B2 | 7/2009 | Wall | |
| 7,675,474 | B2 * | 3/2010 | Shtrom | H01Q 3/242 343/700 MS |
| 7,698,853 | B2 * | 4/2010 | Ragon et al. | 43/132.1 |
| 7,707,767 | B2 * | 5/2010 | Ragon et al. | 43/132.1 |
| 7,724,201 | B2 * | 5/2010 | Nysen | H01Q 1/2275 343/795 |
| 7,884,774 | B2 * | 2/2011 | Huang | H01Q 1/243 343/700 MS |
| 7,956,815 | B2 * | 6/2011 | Ohira et al. | 343/730 |
| 8,130,162 | B2 * | 3/2012 | Kildal | H01Q 9/16 343/792.5 |
| 8,193,989 | B2 * | 6/2012 | Fujita | H01Q 1/007 343/700 MS |
| 8,199,064 | B2 * | 6/2012 | Semonov et al. | 343/818 |
| 8,317,703 | B2 * | 11/2012 | Brannan | A61B 8/0858 607/101 |

(56) References Cited

U.S. PATENT DOCUMENTS

| | | | |
|---|---|---|---|
| 8,319,695 B2* | 11/2012 | Rofougaran | H01L 23/66 343/700 MS |
| 8,467,737 B2* | 6/2013 | Choudhury et al. | 455/73 |
| 8,471,772 B2* | 6/2013 | Puente Baliarda et al. | 343/700 MS |
| 8,570,212 B2* | 10/2013 | Yano | H01P 1/064 343/786 |
| 8,665,173 B2* | 3/2014 | Livingston | 343/872 |
| 8,674,887 B2* | 3/2014 | Sanz | H01Q 1/243 343/700 MS |
| 8,768,485 B2* | 7/2014 | Hancock | A61B 18/18 607/101 |
| 8,795,267 B2* | 8/2014 | Hancock | A61B 18/18 606/33 |
| 8,805,480 B2* | 8/2014 | Hancock | A61B 5/0507 607/101 |
| 8,823,461 B2* | 9/2014 | Shi | H01R 24/542 343/767 |
| 8,836,606 B2* | 9/2014 | Kish | H01Q 3/242 343/725 |
| 8,872,703 B2* | 10/2014 | Degen | H01Q 1/38 343/700 MS |
| 8,872,715 B2* | 10/2014 | Lea | H01Q 9/285 343/747 |
| 8,943,744 B2* | 2/2015 | Cohen | A01M 1/226 43/124 |
| 8,968,287 B2* | 3/2015 | Shroff | A61B 18/18 606/33 |
| 9,241,763 B2* | 1/2016 | Kim | A61B 18/1815 |
| 9,462,798 B2* | 10/2016 | Ribiere-Tharaud | A01M 1/02 |
| 2002/0180607 A1* | 12/2002 | Donskoy et al. | 43/132.1 |
| 2002/0193783 A1* | 12/2002 | Gauthier | A61B 18/1492 606/17 |
| 2003/0160730 A1* | 8/2003 | Alsliety | 343/795 |
| 2003/0163128 A1* | 8/2003 | Patil | A61B 5/0538 607/101 |
| 2004/0009092 A1* | 1/2004 | Diaferia | A01M 21/046 422/21 |
| 2005/0039379 A1* | 2/2005 | Pollinger | 43/132.1 |
| 2006/0017617 A1* | 1/2006 | McGrath | H01Q 9/30 343/700 MS |
| 2006/0116673 A1* | 6/2006 | Gauthier | A61B 18/1492 607/101 |
| 2007/0085744 A1* | 4/2007 | Engel | H01Q 21/064 343/700 MS |
| 2008/0071259 A1* | 3/2008 | Gauthier | A61B 18/1492 606/33 |
| 2008/0272976 A1* | 11/2008 | Kitamori et al. | 343/793 |
| 2009/0046794 A1* | 2/2009 | Maruyama | H01Q 9/0435 343/700 MS |
| 2009/0132015 A1* | 5/2009 | Miller | A61B 18/1815 607/101 |
| 2009/0157068 A1* | 6/2009 | Kallel | A61B 18/1492 606/33 |
| 2009/0232602 A1* | 9/2009 | Joines | 43/132.1 |
| 2009/0256767 A1* | 10/2009 | Kan | H01Q 1/2258 343/795 |
| 2010/0036369 A1* | 2/2010 | Hancock | A61N 5/04 606/33 |
| 2010/0045560 A1* | 2/2010 | Sakuma | H01Q 1/38 343/793 |
| 2010/0168727 A1* | 7/2010 | Hancock | A61B 18/18 606/33 |
| 2010/0177002 A1* | 7/2010 | Lee | H01Q 1/243 343/795 |
| 2011/0004205 A1* | 1/2011 | Chu | A61B 18/18 606/33 |
| 2011/0050528 A1* | 3/2011 | Montgomery | H01Q 1/243 343/795 |
| 2012/0010609 A1* | 1/2012 | Deem | A61B 18/18 606/33 |
| 2012/0116486 A1* | 5/2012 | Naga | A61B 18/1815 607/102 |
| 2012/0146869 A1* | 6/2012 | Holland | H01P 5/10 343/795 |
| 2012/0218168 A1* | 8/2012 | Semonov et al. | 343/872 |
| 2013/0072924 A1* | 3/2013 | Burgener | H01Q 1/36 606/33 |
| 2013/0237979 A1* | 9/2013 | Shikhman | A61B 18/18 606/33 |
| 2013/0267943 A1* | 10/2013 | Hancock | A61B 18/042 606/33 |
| 2013/0300624 A1* | 11/2013 | Fakharzadeh Jahromi | 343/793 |
| 2013/0305590 A1* | 11/2013 | Bessei et al. | 43/132.1 |
| 2014/0145908 A1* | 5/2014 | Atsumi | H01Q 1/1207 343/878 |
| 2014/0159976 A1* | 6/2014 | de Rochemont | H01Q 1/362 343/793 |
| 2014/0203975 A1* | 7/2014 | Chen | 343/872 |
| 2014/0292604 A1* | 10/2014 | Kaneda et al. | 343/700 MS |
| 2014/0358140 A1* | 12/2014 | Emmons | A61B 18/1815 606/33 |
| 2014/0361946 A1* | 12/2014 | Ganchrow et al. | 343/700 MS |
| 2015/0054703 A1* | 2/2015 | Yano | H01P 1/064 343/762 |
| 2015/0061956 A1* | 3/2015 | Yano | H01Q 15/16 343/781 CA |
| 2015/0087522 A1* | 3/2015 | Kawaguchi et al. | 343/872 |
| 2015/0207217 A1* | 7/2015 | Fujita | 343/872 |
| 2015/0313670 A1* | 11/2015 | Shroff | A61B 18/1815 606/33 |
| 2016/0051327 A1* | 2/2016 | Brannan | A61B 18/1815 606/33 |
| 2016/0051328 A1* | 2/2016 | Brannan | A61B 17/3211 606/33 |

FOREIGN PATENT DOCUMENTS

| | | | | |
|---|---|---|---|---|
| DE | 19850195 A1 | * | 4/2000 | A01M 1/22 |
| DE | WO 0024247 A1 | * | 5/2000 | A01M 1/226 |
| ES | 2185484 A1 | | 4/2003 | |
| FR | 2836009 A1 | | 8/2003 | |
| GB | 666822 A | * | 2/1952 | H01Q 1/28 |
| JP | 10295249 A | * | 11/1998 | A01M 1/22 |
| JP | 11009168 A | * | 1/1999 | A01M 1/22 |
| WO | 9613157 A1 | | 5/1996 | |
| WO | WO 9613157 A1 | * | 5/1996 | A01M 1/22 |
| WO | 0024247 A1 | | 5/2000 | |
| WO | WO0024247 A1 | * | 5/2000 | A01M 1/22 |

OTHER PUBLICATIONS

Patent Coorporation Treaty International Searching Authority, International Search Report for PCT/US2013/025987, Apr. 19, 2013, pp. 1-2.

"The ARRL Handbook for Radio Amateurs." 73rd ed. Newington, CT: American Radio Relay League, 1996. 20.64-20.71. Print.

* cited by examiner

APPARATUS FOR USING MICROWAVE ENERGY FOR INSECT AND PEST CONTROL AND METHODS THEREOF

CROSS-REFERENCE TO RELATED APPLICATIONS

This application is a continuation of U.S. patent application Ser. No. 13/766,672, filed Feb. 13, 2013, which claims the benefit of U.S. Provisional Patent Application 61/600,508, filed Feb. 17, 2012. The contents of the Ser. No. 13/766,672 application and the 61/600,508 application are incorporated herein by reference in their entireties.

FIELD OF THE INVENTION

The present invention relates to systems and methods used in the performance of insect and pest control. More specifically, the present invention relates to an apparatus for using microwave energy for treating an infected site infested with insects or other small pests and methods thereof.

BACKGROUND

Bedbugs (*Cimex lectularius* and other varieties) as household pests were largely eliminated in the early 1940s in developed countries. However, over the past decade, there has been a resurgence of bedbug infestations throughout the world, and particularly in the United States. This resurgence has been attributed to many factors, including increased international travel, increased exchange and use of previously owned furniture, and resistance to insecticides previously used in control treatments. Despite this resurgence, there has not been adequate developments in managing bedbug infestations.

Bedbugs, while typically found in the seams and crevasses of mattresses and in the folds of sheets and blankets on beds and in the linings of pillows, can also spread via and live on traveling bags, clothing, carpeting, and almost every location of an infected site.

In the past, many insect infestations were treated through the use of the chemical insecticide DDT (dichlorodiphenyltrichloroethane). However, due to the environmental impact and health risks involved with its use, DDT as an insecticide has been banned in the United States since 1972 and in agricultural use throughout much of the world under the Stockholm Convention in 2004. It should be noted, however, that bedbugs resistant to DDT have been plaguing the population for decades.

Aside from DDT, other insecticides that have been used to control an insect infestation include pyrethroids, dichlorvos, and malathion. However, the insecticide approach has disadvantages. Chemical insecticides are seldom effective in controlling an infestation with just one application, and often require several repeat applications or treatment sessions in order to properly clear the infestation. Also, the use of chemical insecticide treatments on items such as mattresses requires sufficient ventilation and time for the chemicals to disperse from the item before it can be used again. Further, insecticides also pose problems after their use in that any chemical residue left by the insecticide can trigger allergic reactions, and the possibility of health risks such as cancer or neurotoxicity in humans and pets after long term exposure have not been thoroughly explored. Thus, for a personal item such as a mattress, where prolonged and close contact is typical, chemical treatments are undesirable. In any case, bedbugs and a few other insect species are immune to virtually all insecticides.

Alternatives to insecticides involve the use of inorganic material (such as boric acid), vacuuming, and heat treatment. Heat treatments are generally effective in controlling bedbugs. A typical heat treatment may involve steam, which, while effective in killing all stages of bed bugs, may not be effective or practical for large items such as mattresses or treating large areas of the surrounding environment. Also, moisture left over by steam treatments may lead to mold or moisture damage. Dry high heat treatments generally require repeated applications, and are difficult to apply at infection sites and can damage the treated material. Because the bedbugs and their eggs are so small and the bugs themselves can retreat within crevices or penetrate deep into fabrics, treatment methods must be able to address locations or items where depth is an issue, without the damaging effects of residual moisture or high, dry heat.

In order to address the above problems and deficiencies associated with the bedbug and insect treatments discussed above, an apparatus for microwave energy treatment of infection sites infested with insects or other small pests is disclosed. The microwave energy is generated and transmitted to an antenna, where it is radiated to an infected site. The microwave energy is absorbed by the insects, their eggs or larvae, or small pests, which raises their internal temperature up to the point of death, with little or no impact on surrounding fabrics or mattress materials and wood.

BRIEF SUMMARY OF THE INVENTION

In certain aspects, an apparatus for using microwave energy for treating an infected site infested with insects or other small pests is provided. In one embodiment, the instrumentation comprises a source of microwave energy connected to a power source, a transmission element, and an antenna.

In other embodiments, the instrumentation comprises a source of microwave energy connected to a power source, a transmission element, and an antenna. The instrumentation optionally further comprises a waveguide or a coaxial cable as a transmission element.

In yet another embodiment, an apparatus comprises a source of microwave energy connected to a power source, an isolator, a transmission element, and an antenna. Optionally, the antenna further comprises a beam forming antenna that focuses the microwave energy into a beam that can be directed at an area of infestation. The beam forming antenna optionally further comprises a baffle to absorb or prevent unwanted radiation from the beam forming antenna from reflecting or scattering toward the operator or towards other uncontrolled directions.

In yet another embodiment, an apparatus for using microwave energy for treating an infected site infested with insects or other small pests comprises a source of microwave energy connected to a power source, an isolator, a transmission element, and an antenna. The antenna optionally further comprises a beam forming antenna that focuses the microwave energy into a beam that can be directed at an area of infestation. The beam forming antenna optionally further comprises a baffle to absorb or prevent unwanted radiation from the beam forming antenna from reflecting or scattering toward the operator. The beam forming antenna is optionally flexibly connected to the source of source of microwave energy, allowing for the operator to easily position by hand the antenna toward an infected site that is infested with insects for illumination by the microwave energy. The flexibly connected beam forming antenna also allows for the operator to scan an infected site to illuminate the infected site a portion at a time until the entire site has been illuminated and effectively treated.

In certain aspects, a method for treating an infected site infested with small insects and other pests is provided. The method optionally comprises providing an apparatus for using microwave energy for treating an infected site infested with insects or other small pests comprising a source of microwave energy connected to a power source, an isolator, a transmission element, and an antenna. The method optionally further comprises generating microwave energy sourced from the microwave generator. The method optionally further comprises forming the microwave energy into a beam of microwave energy. The method optionally further comprises directing the beam of microwave energy toward the infected site. The method optionally further comprises illuminating the infected site.

In certain aspects, a method for treating an infected site infested with small insects and other pests is provided. The method optionally comprises providing an apparatus for using microwave energy for treating an infected site infested with insects or other small pests comprising a source of microwave energy connected to a power source, an isolator, a transmission element, and an antenna. The method further comprises generating microwave energy sourced from the microwave generator. The method further comprises forming the microwave energy into a beam of microwave energy. The method further comprises directing the beam of microwave energy toward the infected site. The method further comprises illuminating the infected site. The method further comprises scanning the infected site to illuminate at least a portion of the infected site. The method further comprises scanning a remaining portion of the infected site such that an area encompassing the infected site is illuminated.

BRIEF DESCRIPTION OF THE DRAWINGS

The above and other aspects, features and advantages of the present invention will be more apparent from the following more particular description thereof, presented in conjunction with the following drawings, wherein.

Figure 1:
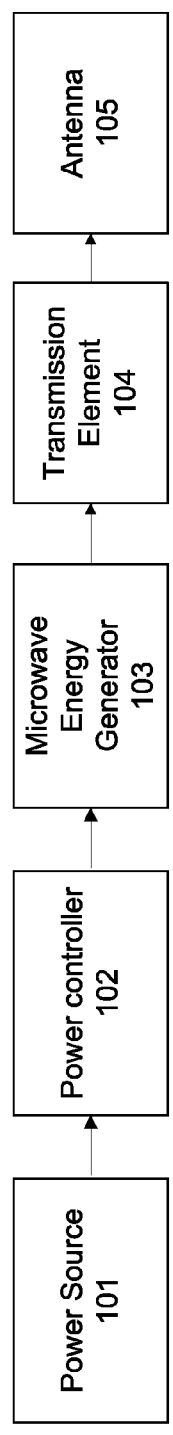
FIG. 1 is a diagram depicting an apparatus for insect pest control according to one embodiment.

Corresponding reference characters indicate corresponding components throughout the several views of the drawings. Skilled artisans will appreciate that elements in the figures are illustrated for simplicity and clarity and have not necessarily been drawn to scale. For example, the dimensions, sizing, and/or relative placement of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will also be understood that the terms and expressions used herein have the ordinary meaning as is usually accorded to such terms and expressions by those skilled in the corresponding respective areas of inquiry and study except where other specific meanings have otherwise been set forth herein.

DETAILED DESCRIPTION

The following description is not to be taken in a limiting sense, but is made merely for the purpose of describing the general principles of the invention. The scope of the invention should be determined with reference to the claims. The present embodiments address the problems described in the background while also addressing other additional problems as will be seen from the following detailed description. Numerous specific details are set forth to provide a full understanding of various aspects of the subject disclosure. It will be apparent, however, to one ordinarily skilled in the art that various aspects of the subject disclosure may be practiced without some of these specific details. In other instances, well-known structures and techniques have not been shown in detail to avoid unnecessarily obscuring the subject disclosure.

FIG. 1 is a diagram depicting the configuration of components of an embodiment of an apparatus for use in treating insect and other small pest infestations according to certain aspects of the present disclosure. The apparatus comprises a power source 101 connected to a power controller 102, which controls the power input to a microwave energy generator 103. The microwave energy generated by the microwave energy generator 103 is transmitted via a transmission element 104 to an antenna 105, where the microwave energy is then radiated to effectuate treatment of an infected site infested with insects or other small pests.

Figure 2:
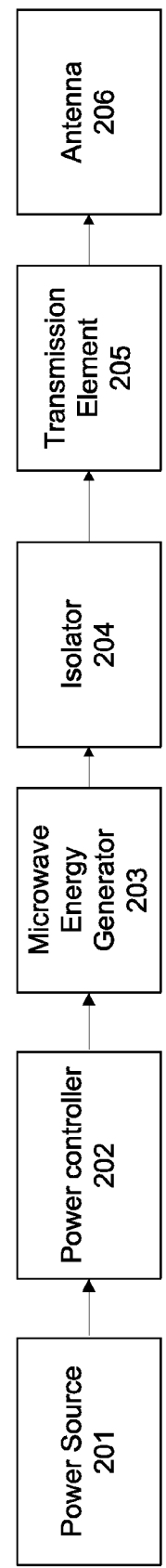
FIG. 2 is a diagram depicting an apparatus for insect pest control according to another embodiment.

FIG. 2 is a diagram depicting the configuration of components of another embodiment of an apparatus for use in treating insect and other small pest infestations according to certain aspects of the present disclosure. The apparatus comprises a power source 201 connected to a power controller 202, which controls the power input to a microwave energy generator 203. The microwave energy generated by the microwave energy generator 203 is passed through an isolator 204 and is then transmitted via a transmission element 205 to an antenna 206, where the microwave energy is then radiated to effectuate treatment of an infected site infested with insects or other small pests.

A typical operator of the apparatus controls the microwave radiation power and energy intensity via the power controller 202, depending on the characteristics of the infected site. For example, a greater microwave energy intensity or power may be desired for eliminating insect pests deep within a mattress compared to those pests located within carpet or other comparatively thin material. The level of power or intensity desired varies depending on the desired treatment time, insect type/size, or other environmental factors.

In various embodiments, the microwave energy generator 203 comprises any of a wide variety of devices capable of generating microwave power known to those skilled in the art. A magnetron, for instance, may be used as the source of microwave energy, as such devices are readily and commercially available at a variety of different power levels. A typical magnetron, as used in a household microwave oven, operates in the 2.35 to 2.65 GHz band and can heat protein, fats, carbohydrates, water, oils, and electrolytes found in food, thus making it suitable for raising the internal temperature of insects, their eggs or larvae, or small pests at an infection site to fatal levels.

In various embodiments, the magnetron comprises a cylindrical cathode, a heater, and an anode arranged in a vacuum sealed glass envelope. The anode is configured with a number of recesses in the interior face and has external fins or slots to facilitate cooling by an electric fan. The space within the glass envelope between the cathode and the anode comprise a resonant cavity. A magnetic circuit comprising pole pieces and a permanent magnet assembly configured to provide an essentially axial magnetic field within the space between the cathode and anode. When the cathode is heated to emission temperatures, and a voltage is applied between the cathode and anode, electrons flow from the cathode to the anode. Due to the presence of the magnetic field, the electrons are diverted to move in a circular pattern, which builds up electromagnetic fields resonating at the frequency of the resonant cavity space. The entire assembly comprising the vacuum tube, the magnetic material, and the cooling fan bear considerable weight.

The magnetron requires two sources of voltage to operate. A first voltage provides power to the heater needed to raise the temperature of the cathode to the point at which it emits a substantial quantity of electrons into the cavity, and is generally on the order of 3-6 volts; the second voltage is applied to the anode, and is generally on the order of several thousand volts. The wiring to carry the heavy heater current and the very high voltage anode voltage should be installed in a secure well protected and well insulated conduit for safety. Thus, it is preferential to place these components in a location where the wiring is short and secure.

The configuration of the isolator 204 between the microwave energy generator 203 and transmission element 205 prevents almost all reflected power from returning to the microwave energy generator 203, which would affect its performance.

According to principles understood by those skilled in the art, the magnetron (the power source) and the antenna (the load) are configured to be impedance matched, such that almost all the power generated by the magnetron is transmitted through the antenna. However, in practice, the antenna may be placed at varying distances to the area targeted for treatment, depending on the scale and extent of the pest infestation. When the target area is in close proximity to the antenna, some power will be reflected back into the antenna, and will propagate back through the transmission element to the magnetron. This reflected energy reentering the magnetron cavity will disturb the circulation pattern of the electrons, causing a change of frequency and efficiency and can lead to ineffective treatment of an infection site. If the reflected energy is of sufficient magnitude, this will result in instability which interferes with the proper operation of the magnetron. The isolator 204 minimizes the detrimental effects of reflected power due to impedance mismatches while the apparatus is in use. Non-limiting examples of isolators that can be used include ferroelectric material, ferromagnetic material, or other isolation devices, materials, or methods known or commercially available to those skilled in the art. The isolator may be placed anywhere along the path of the transmission element, preferably near the magnetron output port. In some circumstances, where the detailed design can accept a loss of efficiency due to reflected power, the isolator may be omitted.

In some embodiments, the transmission element 205 comprises a waveguide or a flexible cable, such as a coaxial cable, depending on the characteristics of the infected site and the desired location of treatment. For instance, an extended slotted waveguide antenna array or other multi-element array may be more suitable than a pyramidal horn for greater flexibility and easier access to certain infestation areas. Optionally, the use of a flexible coaxial cable can provide versatility in treating a variety of items and locations, without increasing the overall footprint of the apparatus. Also, a flexible coaxial cable would allow for an operator to treat infection sites of various sizes via a scanning method, lessening or eliminating the need to change the configuration of the antenna to adjust radiation area, beam size, or other radiation characteristics.

In one embodiment, the antenna 206 comprises a beam forming antenna for shaping the microwave energy as a directed beam of microwave energy. This allows for targeted treatments to isolate surrounding areas not infected, or for concentrating the intensity of the beam for deep penetration as required for treatment. An example of such an antenna is a pyramidal horn antenna. Optionally, a baffle further comprises antenna 206 in order to provide some protection to the operator from unwanted microwave radiation due to scattering and reflection.

Figure 3:
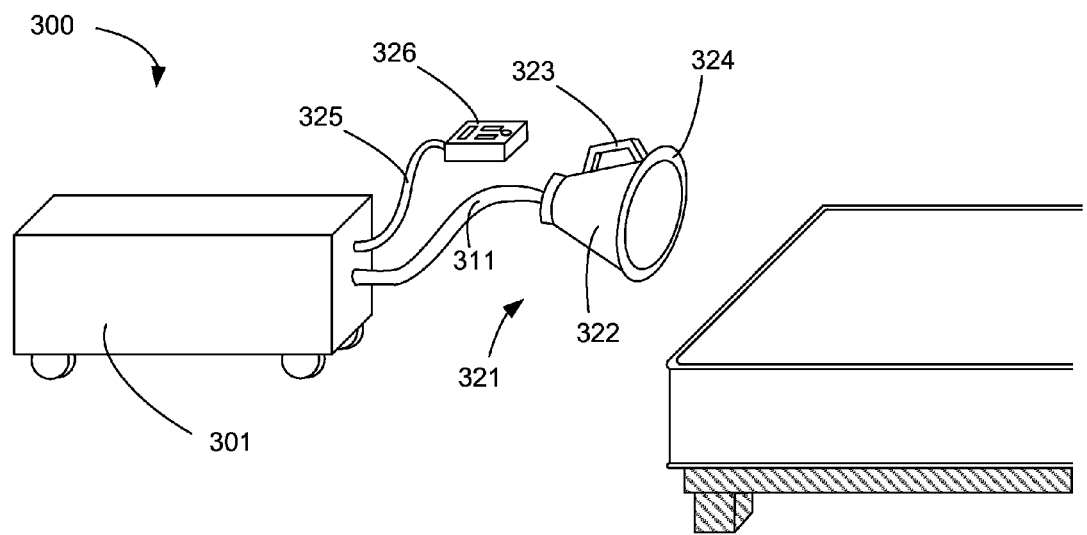
FIG. 3 is a diagram depicting an apparatus for insect pest control according to yet another embodiment.

FIG. 3 illustrates an example of the embodiment of an apparatus for use in treating insect and other small pest infestations of FIG. 2. The apparatus 300 comprises a portable apparatus case 301, a transmission element 311, and an antenna 321.

According to aspects in the present disclosure, in various embodiments, the apparatus is plugged into a standard power socket, or the apparatus case 301 houses a portable power source such as a battery to bolster its portability. In the apparatus of FIG. 3, the apparatus case houses a battery or a line cord to connect to a wall outlet as the power source, a power controller, a magnetron as the microwave energy source, and an isolator to protect the functionality of the magnetron from reflected energy. The apparatus case 301 also comprises, in some embodiments, other considerations as to portability, such as wheels, a handle, and other accessories.

The transmission element 311 in the apparatus of FIG. 3 is, in one embodiment, a flexible coaxial cable, which also aids in portability as well as provides greater versatility in treating a variety of items and locations. Flexibility in the transmission element 311 also allows an operator to use the antenna 321 to scan an infected site where the infected site's area is larger than the area covered by the microwave energy radiated by the antenna 321.

The antenna 321 in FIG. 3, in accordance with one embodiment, comprises a pyramidal horn beam-forming antenna 322, a handle 323, and a baffle 324. The handle 323 allows for handheld use of an operator during a treatment of an infected site, and aids in scanning an infected site where the infected site's area is larger than the area covered by the microwave energy radiated by the antenna 321. The baffle 324 provides some protection to the operator from unwanted microwave radiation scattered or reflected from the pyramidal horn beam-forming antenna. The Control Cable 325, conveniently bundled with the microwave coaxial cable, connects to Control Pad 326 which is attached to the handle to facilitate operator control of the apparatus.

Figure 6:
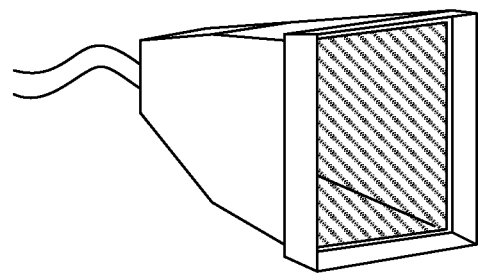
FIG. 6 is a diagram depicting a pyramidal horn antenna in an apparatus for insect pest control according to yet another embodiment.

In yet another embodiment of the apparatus, an example of an antenna comprising a pyramidal horn antenna is illustrated in FIG. 6. The antenna may be shaped according to characteristics of infected sites or in accordance with desired radiation parameters for effective treatment of infected sites.

Figure 7:
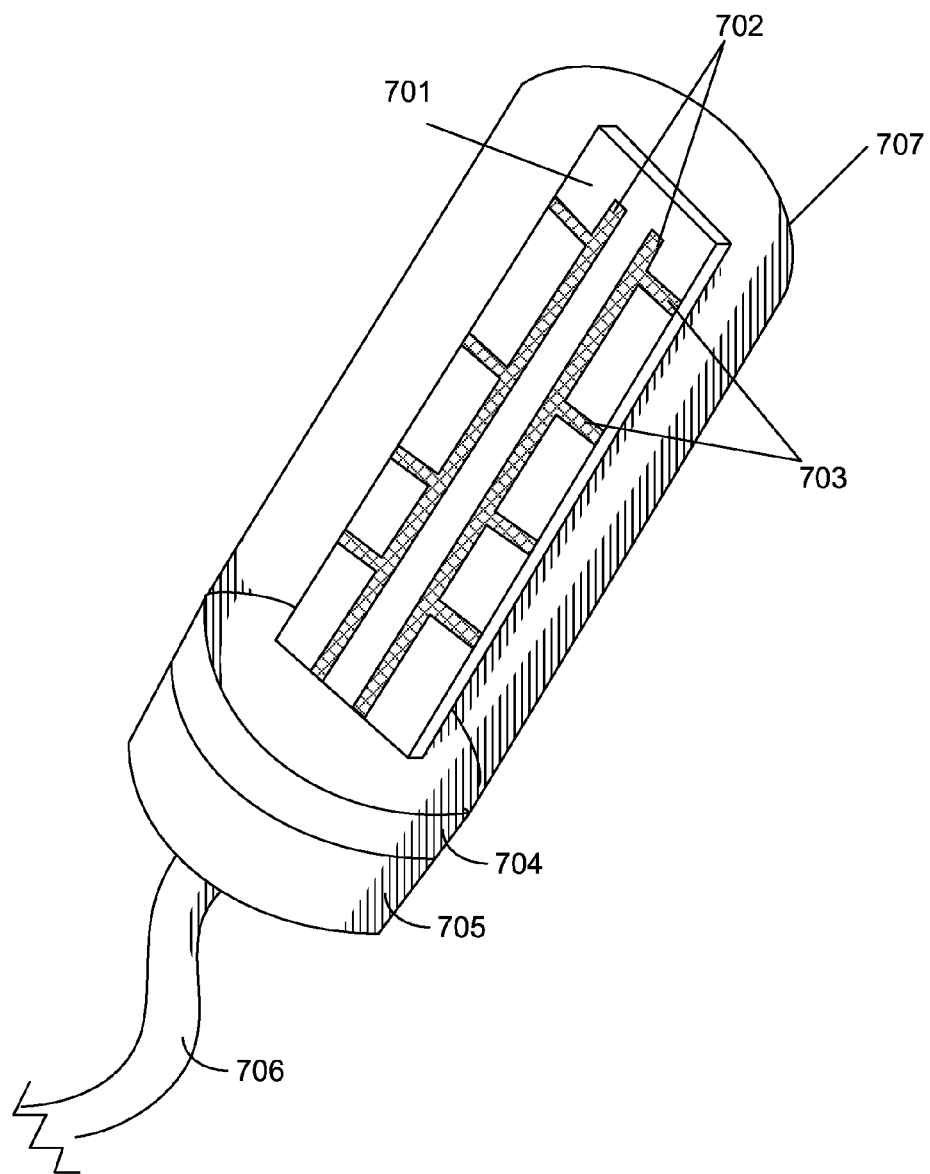
FIG. 7 is a diagram depicting an end fire array antenna in an apparatus for insect pest control according to yet another embodiment.

In yet another embodiment of the apparatus, an example of an antenna comprising an end fire array antenna is illustrated in FIG. 7. In this embodiment, the end fire array antenna comprises an insulated board whereupon at least one transmission line pair and at least one radiating element are secured. As illustrated in FIG. 7, a circuit board 701 comprises the insulated board upon which a parallel pair of transmission lines 702 is secured. The parallel pair of transmission lines 702 is coupled with radiating elements 703 also secured on circuit board 701. The circuit board 701 is mounted to a transition section 704 that couples the parallel pair of transmission lines 702 to a coaxial cable 706. The transition section 704 is mounted on a baffle 705. The coupling of the parallel pair of transmission lines 702 and the coaxial cable 706 within the transition section 704 is understood by those skilled in the art. The coaxial cable 706 is connected to a microwave power source as recited in this disclosure (not shown). The end fire array antenna also comprises a microwave-transparent cover 707 that covers the circuit board 701.

As illustrated in FIG. 7, multiple radiating elements may be secured to the circuit board 701, which will alter the radiation pattern of the subsequent beam. Adjustment of the number, spacing, shape, size, and arrangement of the both the transmission line and radiating elements may be utilized to effectuate desired radiation patterns based on the infestation site to be treated. Adjustment of the size of the beam effective area is set by the length and number of radiating elements. Adjusting the spacing and phase feed of the elements results in adjustments to the far field beam pattern.

The radiated beam in the normal, or far field, of the end fire array is coaxial to the array. One advantage to use of the end fire array antenna is utilization of the end fire array antenna's near field radiating pattern. When the antenna is laterally placed close to the target area, the energy from the radiating elements is more directly radiated to the target site or object being treated. For instance, such an antenna allows an operator to treat an infestation site such as a rug by holding the antenna array close, which maximizes the energy transfer from the radiating elements to the target. Alteration of the beam characteristics via modification of the radiating elements is understood by those skilled in the art.

Figure 4:
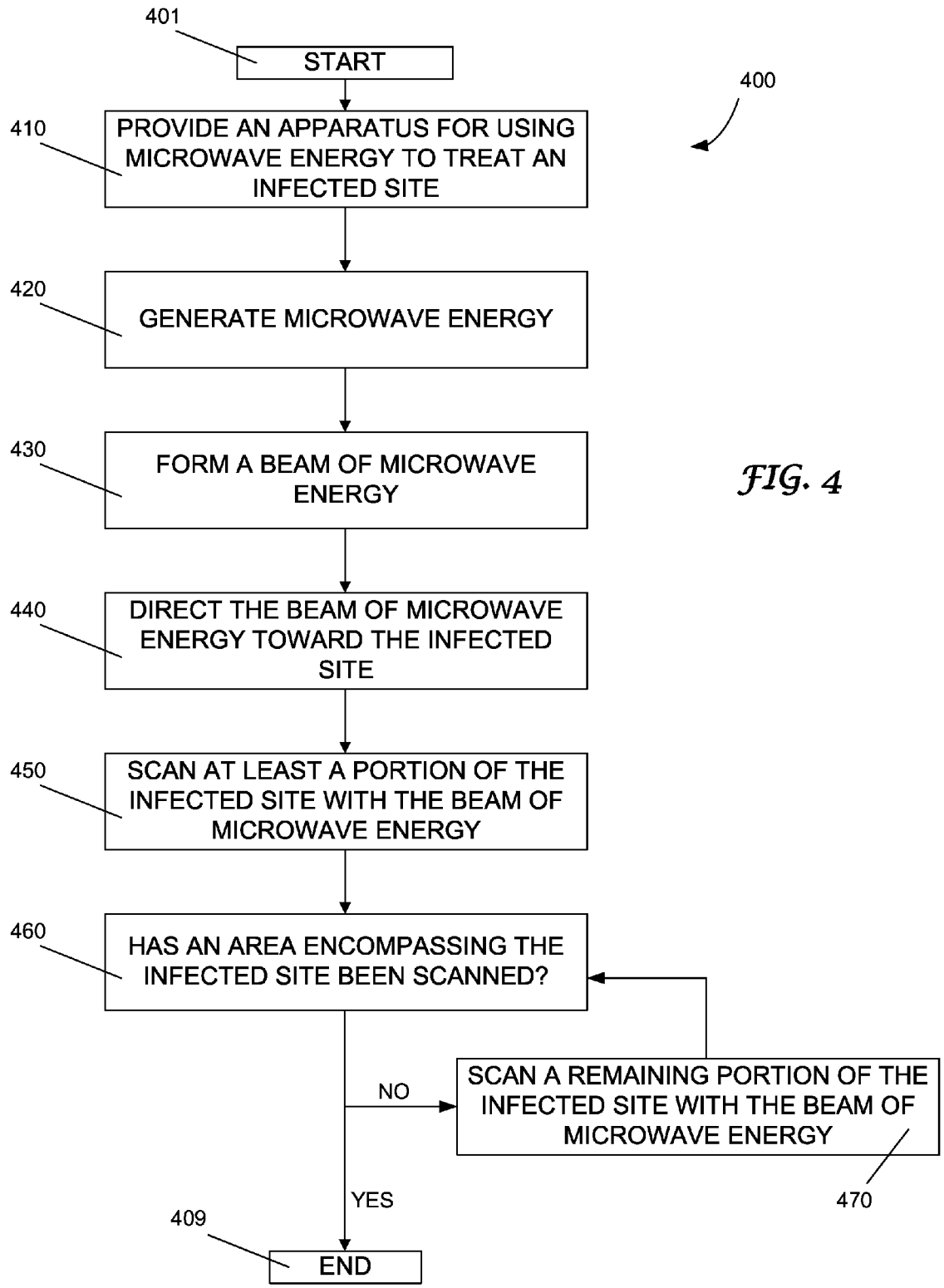
FIG. 4 is a flowchart illustrating an exemplary method or process for employing an apparatus for insect pest control for treating an infected site infested with small insects and other pests according to one embodiment.

FIG. 4 is a flowchart illustrating an exemplary method or process 400 employing an apparatus for using microwave energy for treating an infected site infested with insects or other small pests according to certain aspects of the present disclosure. The exemplary process 400 begins at start state 401 and proceeds to operation 410 where an apparatus for using microwave energy to treat an infected site infested with insects or other small pests is provided. Non-limiting examples of such an apparatus for using microwave energy to treat an infected site infested with insects or other small pests are described above with respect to FIG. 1 through FIG. 3 and FIGS. 6 and 7.

The exemplary process 400 proceeds to operation 420 in which microwave energy is generated from the apparatus for using microwave energy to treat an infected site infested with insects or other small pests. The exemplary process 400 proceeds to operation 430 in which a beam of microwave energy is formed. Non-limiting examples of antennas for forming such a beam of microwave energy are described above with respect to FIGS. 3, 6 and 7.

The exemplary process 400 proceeds to operation 440, where the beam of microwave energy is directed toward the infected site. The exemplary process 400 proceed to operation 450 in which an operator scans at least a portion of the infected site with the beam of microwave energy. The rate of scanning can depend on the size and depth of the infected site, the magnitude of insect and/or small pest infestation, the microwave power level and intensity, and the type of antenna used during treatment.

The exemplary process 400 proceeds to operation 460, which is a decision point for the operator whereby a determination is made whether an area encompassing the infected site has been scanned by the scanning performed from operation 450. If the operator determines that an area encompassing the infected site has not been illuminated (i.e., the infected site is larger than an area of radiation covered by the microwave energy radiated by the antenna during the scanning process), then the exemplary process 400 proceeds to operation 470, wherein the operator scans a remaining portion of the infected site with the beam of microwave energy. The exemplary process 400 proceeds again to operation 460, wherein the operator must again determine if an area encompassing the infected site has been illuminated by the scanning performed from operations 450 and 470. If an affirmative determination has been reached at operation 460, the exemplary process 400 terminates at end process 409. However, if the operator determines that an area encompassing the infected site has still not been illuminated at operation 460, the process 400 repeats the scanning operation of 470 until an affirmative determination that an area encompassing the infected site has been illuminated is reached at operation 460.

Figure 5A:
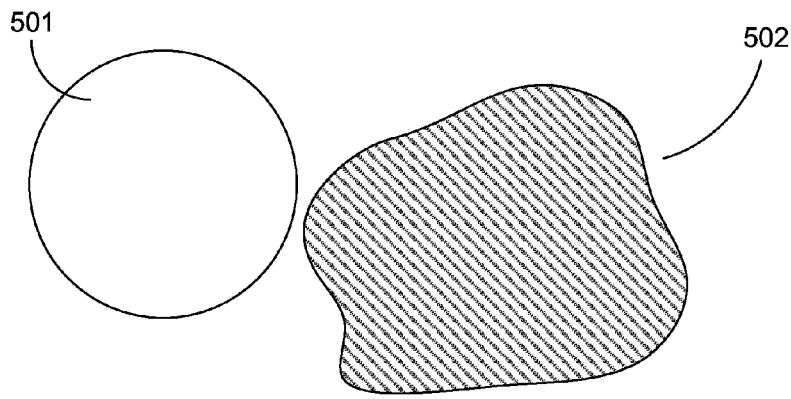
FIGS. 5A-5C are diagrams illustrating the area illuminated in scanning operations from the exemplary method or process of FIG. 4 according to one embodiment.
Figure 5B:
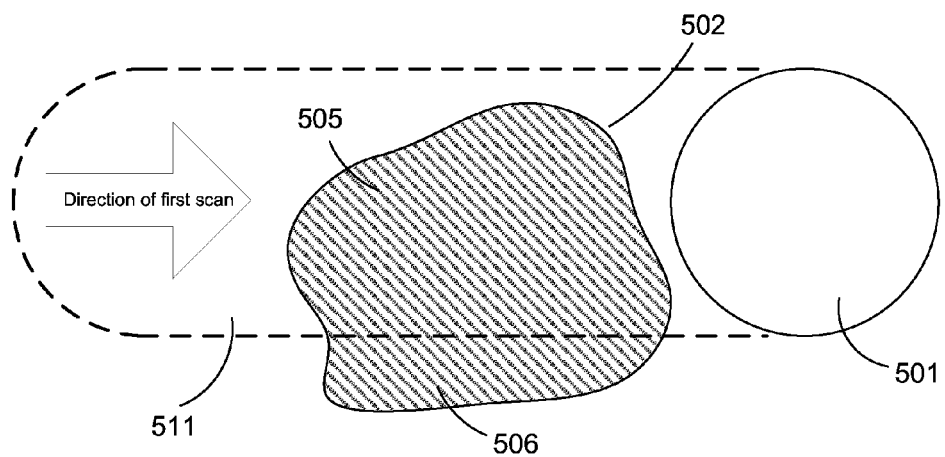
Figure 5C:
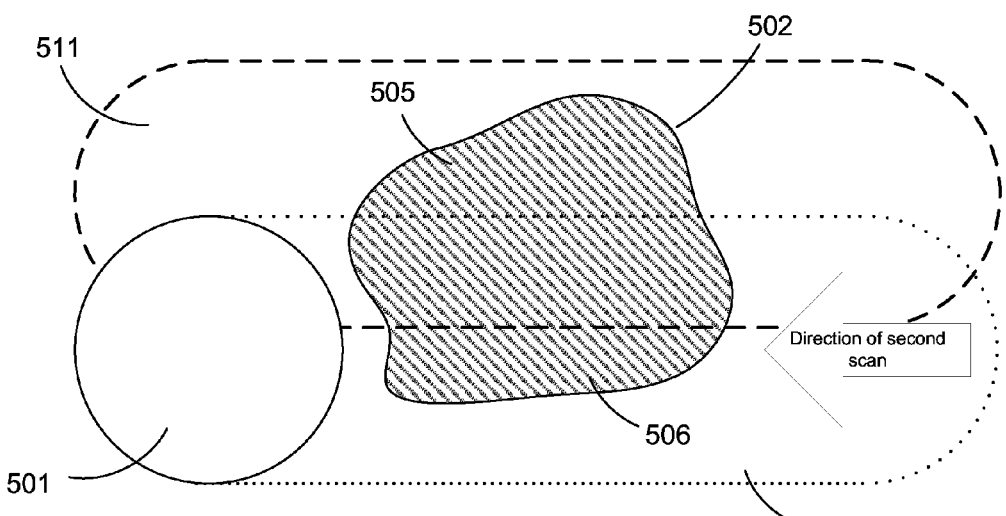

Certain operations of the exemplary process of FIG. 4 are further illustrated in FIG. 5A through FIG. 5C. In FIG. 5A, a beam of microwave energy is directed toward an area encompassing an infected site 502. The beam of microwave energy has an area of radiation 501, which is the area covered by the microwave energy radiated by an antenna in an apparatus for microwave energy for treating an infected site infested with insects or other small pests according to certain aspects of the present disclosure. An operator can perform the scanning procedure from operation 450 of FIG. 4 by scanning at least a portion of an area encompassing an infected site 505, illustrated in FIG. 5B by a directional scan encompassing a first scanned area 511. As can be seen, the size of the area of radiation 501 is comparatively smaller than the size of the area encompassing an infected site 502. The operator would then determine at operation 460 of FIG. 4 that the first scanned area 511 scanned from the scanning procedure from operation 450 of FIG. 4 does not encompass an area encompassing an infected site, and thus proceed to operation 470 of FIG. 4 as illustrated in FIG. 5C, whereby the operator scans a remaining portion 506 of the area encompassing an infected site 502. The scan of the remaining portion 506 encompasses a second scanned area 512, which, in combination with the first scanned area 511, encompasses the area encompassing an infected site 502. Upon this determination, the operator would then terminate the process of FIG. 4.

The operator is not limited to the directions nor the angles with which scans may be performed, as the infected area may have varying characteristics in both area and depth. The level of power and duration of exposure during the scanning process may vary depending on the size and extent of the infestation as determined by methods familiar to those skilled in the art in view of the present disclosure. Further, the selection of a single frequency or a band of frequencies used for the apparatus may be enhanced depending on the characteristics of the infestation or the location for treatment.

An operator, in using an apparatus according certain aspects of the present disclosure and the methods also disclosed herein, can wear protective clothing to provide additional protection against stray microwave radiation, and employ additional procedures as dictated by safety concerns. For instance, the use of microwave absorbent material may be when scanning such things as clothing with metal buttons, fasteners or ornaments that may concentrate, scatter, or reflect the microwave energy. The microwave absorbent material can be used to cover any metal material or ornaments in order for the operator to scan the items safely.

The description of the invention is provided to enable any person skilled in the art to practice the various embodiments described herein. While the present invention has been particularly described with reference to the various figures and embodiments, it should be understood that these are for illustration purposes only and should not be taken as limiting the scope of the invention.

There may be many other ways to implement the invention. Various functions and elements described herein may be partitioned differently from those shown without departing from the spirit and scope of the invention. Various modifications to these embodiments will be readily apparent to those skilled in the art, and generic principles defined herein may be applied to other embodiments. Thus, many changes and modifications may be made to the invention, by one having ordinary skill in the art, without departing from the spirit and scope of the invention.

A reference to an element in the singular is not intended to mean "one and only one" unless specifically stated, but rather "one or more." The term "some" refers to one or more. Underlined and/or italicized headings and subheadings are used for convenience only, do not limit the invention, and are not referred to in connection with the interpretation of the description of the invention. All structural and functional equivalents to the elements of the various embodiments of the invention described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

I claim:

1. An apparatus for using microwave energy to treat an infected site infested with insects or other small pests, the apparatus comprising:
    a microwave energy source that provides the microwave energy at a frequency greater than about 2.3 GHz;
    a flexible transmission element configured to propagate the microwave energy; and
    an end fire array antenna that receives the microwave energy via the flexible transmission element and emits the microwave energy substantially longitudinally from the end fire array in a focused beam toward the infected site, wherein the end fire array antenna is configured to scan the infected site, the end fire array antenna comprising:
        a circuit board;
        a transmission line, comprising a parallel pair of conductors electromagnetically coupled to one another, the parallel pair of conductors comprising:
            a first conductor secured along a plane of the circuit board; and
            a second conductor secured along the plane of the circuit board;
        a first plurality of radiating elements secured on the circuit board and extending from the first conductor away from the second conductor;
        a second plurality of radiating elements secured on the circuit board and extending from the second conductor away from the first conductor;
        wherein the first conductor is not electrically wired to the second conductor; and
        a cover that covers the circuit board, the transmission line, and the first and second plurality of radiating elements.

2. An apparatus for using microwave energy to treat an infected site infested with insects or other small pests, the apparatus comprising:
    a magnetron that provides the microwave energy at a frequency greater than about 2.3 GHz;
    a flexible transmission element configured to propagate the microwave energy; and
    an end fire array antenna that receives the microwave energy via the flexible transmission element and emits the microwave energy substantially, longitudinally from the end fire array in a focused beam toward the infected site, wherein the end fire array antenna is configured to scan the infected site, the end fire array antenna comprising:
        a circuit board;
        a transmission line, comprising a parallel pair of conductors electromagnetically coupled to one another, the parallel pair of conductors comprising:
            a first conductor secured along a plane of the circuit board; and
            a second conductor secured along the plane of the circuit board;
        a first plurality of radiating elements secured on the circuit board and extending from the first conductor away from the second conductor;
        a second plurality of radiating elements secured on the circuit board and extending from the second conductor-away from the first conductor;
        wherein the first conductor is not electrically wired to the second conductor; and
        a cover that covers the circuit board, the transmission line, and the first and second plurality of radiating elements.

3. The apparatus of claim 2, wherein the flexible transmission element comprises coaxial cable.

4. The apparatus of claim 2, wherein the first and second plurality of radiating elements are spaced to create a beam pattern, wherein the first plurality of radiating elements extends substantially perpendicularly from the first transmission line, and wherein the second plurality of radiating elements extends substantially perpendicularly from the second transmission line.

5. The apparatus of claim 2, wherein the end fire array antenna comprises a transition section and a baffle.

6. The apparatus of claim 2, wherein the cover comprises a microwave transparent cover.

* * * * *